Reaction time 1 hr.
(I) $H_2SO_4$ concentration: 5%
(II) $H_2SO_4$ concentration: 20% and 40%

United States Patent Office 3,515,706
Patented June 2, 1970

3,515,706
LACTONIZED ACRYLIC POLYMERS AND PRODUCTION THEREOF
Takashi Minato and Yasuo Matsumura, Saidaiji, Yukio Kojima, Okayama, and Kunio Maruyama, Saidaiji, Japan, assignors to Japan Exlan Company Limited, Osaka, Japan
Filed Mar. 31, 1967, Ser. No. 627,364
Int. Cl. C08f 3/74, 15/02
U.S. Cl. 260—85.5               10 Claims

ABSTRACT OF THE DISCLOSURE

An acrylonitrile copolymer containing a lactone unit of the formula

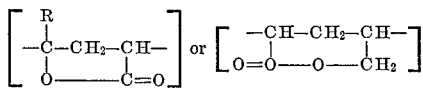

Figure 1:
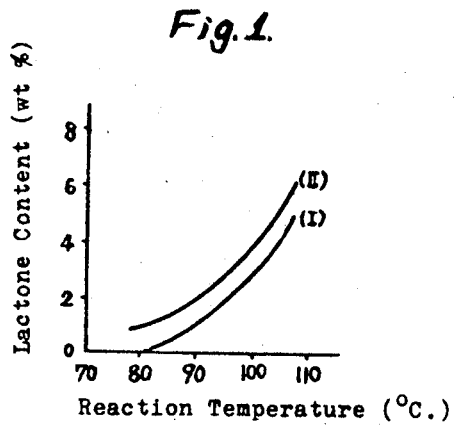

wherein R is a hydrogen atom or methyl group, is prepared by treating a copolymer of acrylonitrile and at least one monomer selected from the group consisting of monomers having a hydroxy group and monomers capable of forming a hydroxyl group with a medium of an acid content of not higher than 40% and at a pH not higher than 2. Such copolymer, because of its excellent physical properties, such as stretch-ability, transparency, strength, etc., as hereinafter exemplified for fibers, is excellently suitable for the manufacture not only of fibers but also of films and other molded articles.

---

This invention relates to lactonized acrylic copolymers, more particularly acrylic copolymers having a lactone unit of the formula:

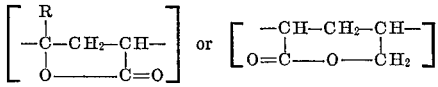

wherein R is a hydrogen atom or methyl group, in the copolymer chain. This invention also relates to the production of such lactonized acrylic copolymers, which comprises treating with an acid an acrylic copolymer of acrylonitrile, and a monomer selected from the group consisting of monomers having a hydroxyl group and monomers which are capable of forming a hydroxyl group.

It is generally well known that an oxycarboxylic acid will form a lactone ring under acidic conditions. It is disclosed, for example, on page 142 of "Chemistry of High Polymers" ("Kobunshi Kagaku" in Japanese) vol. 7 (1950) to form a lactone ring by saponifying with an alkali a copolymer of vinyl acetate and methyl acrylate and then treating the same with an acid solution.

Further, according to Japanese patent publication No. 224/63, acrylic fibers dyeable with basic dyes are produced by forming a carboxyl group, produced by partially saponifying an acrylonitrilic copolymer in an acidic aqueous solution.

The present invention is to selectively form a lactone ring by treating an acrylic copolymer under acidic conditions. The present invention is based on a discovery that, when a copolymer, for example, of acrylonitrile and vinyl acetate is treated under certain conditions, the vinyl acetate unit part and the adjacent acrylonitrile unit part in the high molecular chain will be selectively hydrolyzed and will then be lactonized, but no other secondary reaction will substantially occur.

The reaction is believed to proceed as follows:

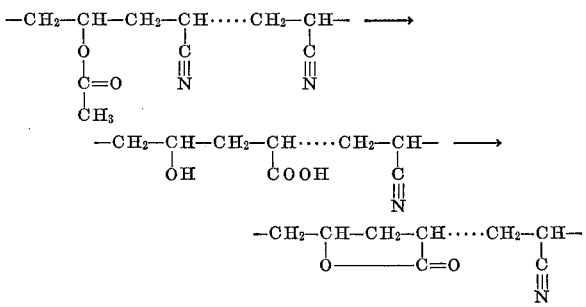

When a lactone ring is formed in a high molecular chain, it will restrict the mobility of liberty of the molecular chain. Therefore, fibers from a copolymer having such cyclized structure are higher in strength and Young's modulus than those fibers obtained from an ordinary copolymer having no cyclized structure or a copolymer not lactonized by an acid-treatment. Thus there can be obtained fibers in which specifically the tendency to elongation in hot water, which is a defect of acrylic fibers, is remarkably reduced.

The method of the present invention can be applied also to a copolymer consisting of acrylonitrile and a monomer having a hydroxyl group. It has been found that, in a copolymer, for example, of acrylonitrile and allyl alcohol, a 6-member ring lactone may be produced by the method of the present invention.

Therefore, an important object of the present invention is to provide a method of making lactonized acrylic copolymers.

A further object of the present invention is to provide a method of making copolymers for obtaining acrylic fibers which are high in strength and Young's modulus, and in which the tendency to elongation in hot water is remarkably reduced.

Other objects will become apparent from the following explanation.

Generally, the objects of the present invention are attained by treating an acrylic copolymer consisting of acrylonitrile and a monomer having a hydroxyl group (or a monomer which can produce a hydroxyl group when treated with an acid) in a medium having an acid concentration of not more than 40% or preferably not more than 20%, and a pH of not higher than 2.

When the acid concentration is higher than 40%, impure structures such as a carboxylic acid or an acid amide will be produced in the copolymer, and will cause undesirable coloring of the copolymer. In order to strictly prevent the formation of such impure structures, it is desirable to carry out the acid treatment under the condition of an acid concentration of not more than 20%. The lower limit of the acid concentration is not critical. But, when the pH is higher than 2, the lactonizing reaction will proceed very slowly.

The degree of lactonization in the copolymer can be controlled by properly selecting the acid-treating conditions such as the treating temperature and treating time under the above mentioned acid concentration. Further, this acid treatment can be conducted either in a homogeneous system or non-homogeneous system.

At the terminal of the coploymer, there are generally present a sulfonic acid group introduced by the decomposition of the catalyst in the polymerizing reaction and also some carboxyl groups produced in the polymerizing process. These acid groups are effective as dye sites and specifically the sulfonic acid group is very effective. Such sulfonic acid will not be damaged at all by the acid treatment of this invention. The increase of the carboxyl group is so slight under the treating conditions of the present invention that the variation of the amount of the dye sites by the lactonization will be little. However, in the fibers obtained from a copolymer in which such a cyclic structure as by lactonization is introduced into the molecular chain, the mobility or liberty of the molecular chain will be restricted as described above, and therefore, with the reduction of the shrinkage by the heat-relaxing treatment of said fibers, the dyeing velocity, or rate of dyeing will be less and the practical dyeing degree will be less.

The monomer having a hydroxyl group useful in this invention is a monomer copolymerizable with acrylonitrile, for example allyl alcohol.

The monomer which can produce a hydroxyl group is a monomer copolymerizable with acrylonitrile, and will produce a hydroxyl group when hydrolyzed under the acid treating conditions of the present invention. Particular examples of such a monomer are vinyl acetate, isopropenyl acetate, vinyl propionate, vinyl isobutylate, vinyl butylate and other vinyl esters, allyl acetate, allyl caproate and other allyl esters.

Further, the acrylic copolymers to be used in the present invention may contain other monomers copolymerizable with acrylonitrile within a limit not obstructing the lactonization in the present invention. Examples of such monomers are allyl sulfonic acid and methallyl sulfonic acid and their salts, styrene, vinyl chloride and vinylidene chloride.

The acid to be used in the present invention may be either in inorganic acid or an organic acid. However, such acids low in oxidizability, as, for example, inorganic acids such as sulfuric acid, hydrochloric acid and phosphoric acid, and organic acid such as formic acid, acetic acid, oxalic acid and toluene sulfonic acid are preferable. In case nitric acid is used, the lactonization will easily progress but such secondary reactions as the production of an acid amide or a carboxylic acid will be caused.

It is preferable that the acrylic copolymers to be subjected to the lactonization in accordance with this invention comprise a predominant proportion (e.g. at least 60% by weight) of acrylonitrile.

The acid treatment should be conducted at a temperature not lower than 60° C. because if the temperature is lower than 60° C. it would take an unduly long time to effect the desired lactonization. Generally, the lactonization proceeds faster as the treating temperature and acid concentration increase.

The present invention will be more concretely explained by referring to the following examples wherein all percentages are by weight unless otherwise specified.

EXAMPLE 1

15 g. of an acrylic copolymer consisting of 89% acrylonitrile and 11% vinyl acetate were dispsersed in 135 g. of an aqueous soltuion of sulfuric acid of any of various concentrations, were acid-treated in a nonuniform system by varying the treating temperature and treating time while being stirred, were then separated by filtration and were washed with water. The lactone content in the thus treated copolymer was measured. Thus, the results shown in Table 1 and FIG. 1 were obtained. The lactone content was indicated with the percentage by weight in the copolymer of the group

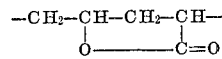

Figure 2:
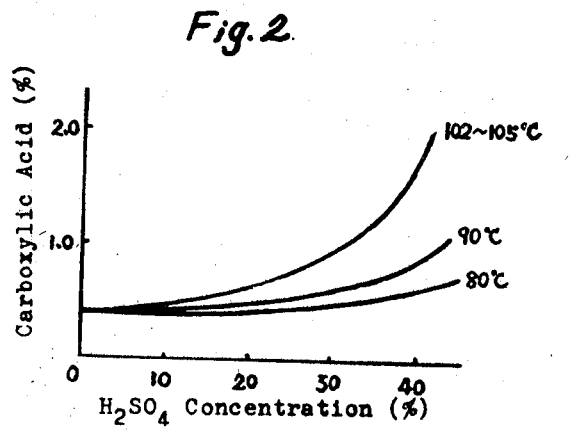

This analysis was made by preparing a copolymer of a known amount of the lactone from a copolymer of methyl acrylate and vinyl acetate and measuring an infrared absorption band of 1176 cm.$^{-1}$ of the obtained copolymer by using the above prepared copolymer as a criterion by a method mentioned on pages 142 to 154 of Chemistry High Polymers, vol. 7. In the treatment shown with parentheses () in Table 1, it was seen from the infrared absorption spectrum that the CN group of the acrylonitrile unit part not adjacent to the vinyl acetate unit part was also hydrolyzed simultaneously with the lactonization and caused an impure structure variation. The colored degrees of the copolymers treated as mentioned above are shown in Table 2. The variations in content (percent) of the carboxyl group in the case where the treating time was 2 hours are shown in Table 3 and FIG. 2. The rise of the colored degree and the incerase of the carboxyl group were shown to be very slight in the case of a sulfuric acid concentration of not more than 20%. Their clear increase was seen in the case of a sulfuric acid concentration of 40%.

The colored degree of the copolymer was calculated from the formula as follows:

$$\text{Colored degree} = \frac{\text{Reflection rate at 595 m}\mu - \text{reflection rate at 453 m}\mu}{\text{reflection rate at 553 m}\mu} \times 100$$

by making the copolymer tablets under an added pressure and selecting the relection rates at the three wave lengths of 453 m$\mu$, 553 m$\mu$ and 595 m$\mu$ from visible reflection curves of the samples for magensium oxide. It is shown that, the larger the numerical value, the higher the colored degree. Further, the carboxyl group in the copolymer was determined by potentiometric titration of a dimethyl formamide solutiin of the copolymer with a caustic soda alcoholic solution.

Further, the amount of sulfonic acid in the copolymer was determined by conductometric-titration of a dimethyl formamide solution of the copolymer with a caustic soda alcoholic solution. As shown in Table 4, no variation was seen in the treatment by the method of the present invention.

TABLE 1

| Sulfuric acid concentration (percent) | Treating temp. (° C.) | Treating time (hours) | | | |
|---|---|---|---|---|---|
| | | 0.5 | 1.0 | 2.0 | 4.0 |
| 2 | [1]101 | [2]1.0 | [2]2.1 | [2]4.0 | [2]6.5 |
| 5 | 80 | [3] | [3] | 1.0 | 1.9 |
| 5 | 90 | 0.2 | 1.1 | 2.8 | 3.9 |
| 5 | [1]102 | 1.9 | 3.0 | 6.0 | 8.2 |
| 10 | [1]103 | 2.3 | 3.2 | 6.9 | 9.7 |
| 20 | 70 | | | | 0.6 |
| 20 | 80 | [3] | 0.9 | 0.8 | 2.7 |
| 20 | 90 | 0.3 | 1.3 | 2.5 | 5.7 |
| 20 | [1]105 | 3.7 | 5.5 | 6.4 | 9.5 |
| 40 | 80 | [3] | 1.2 | 1.9 | 4.0 |
| | 90 | 1.0 | 1.6 | 3.2 | 5.1 |
| | 105 | 3.0 | (5.5) | (9.2) | (11.8) |
| | [1]114 | (5.8) | (10.4) | (11.8) | |

[1] Boiled.
[2] Lactone, wt. percent.
[3] Not more than 0.2.

TABLE 2

| Treating temperature (° C.) | Treating time (hours) | Colored degree | | | | |
|---|---|---|---|---|---|---|
| | | Sulfuric acid concentration (percent) | | | | |
| | | 2% | 5% | 10% | 20% | 40% |
| 80 | 2 | | 2.7 | | 3.3 | 4.2 |
| 90 | 2 | | 3.7 | | 3.6 | 4.9 |
| 105 | 2 | 3.8 | 3.5 | 3.8 | 4.3 | 7.3 |
| 114 | 2 | | | | | 7.0 |

TABLE 3

| Treating temperature (° C.) | Treating time (hours) | Colored degree | | | | |
|---|---|---|---|---|---|---|
| | | Sulfuric acid concentration (percent) | | | | |
| | | 2% | 5% | 10% | 20% | 40% |
| 80 | 2 | ([1]) | [1]0.43 | ([1]) | [1]0.50 | [1]0.59 |
| 90 | 2 | | 0.42 | | 0.51 | 0.87 |
| 105 | 2 | 0.34 | 0.39 | 0.57 | 0.69 | 1.82 |
| 114 | 2 | | | | | 2.56 |

[1] Carboxyl group content (wt. %).
NOTE.—The carboxyl group in the untreated copolymer was 0.35% (wt.).

TABLE 4

Treating condition in aqueous
solution of 20% sulfuric acid
at 105° C. (boiled): —$SO_3H$ (percent)
1 hour _____ 0.39
4 hours _____ 0.38
Untreated _____ 0.38

EXAMPLE 2

100 g. of an acrylic copolymer powder of 89.0% acrylonitrile and 11.0% allyl alcohol were added to 500 ml. of a boiling solution of 20% sulfuric acid and were treated by continuing the boiling for 2 hours in a nonuniform system while being stirred. Then the treated copolymer was filtered and water-washed. Its infrared absorption spectrum was measured. As a result, a hydroxyl group of 3450 cm.$^{-1}$ was seen to have a decreased concentration and an absorption of C=O, C—O—C showing a 6-member ring lactone was recognized at each of 1735 cm.$^{-1}$ and 1165 cm.$^{-1}$. A white lactonized copolymer was obtained.

EXAMPLE 3

An acrylonitrile copolymer powder consisting of 89.0% acrylonitrile and 11% allyl alcohol was treated with 20% phosphoric acid in the same manner as in Example 2 to obtain a white product. The infrared spectographic analysis of this product showed the same adsorption as in the product of Example 2.

EXAMPLE 4

1 g. of a copolymer of 60.5% acrylonitrile and 39.5% vinyl acetate was dissolved in 50 ml. of a mixed solution of 90 parts of acetonitrile and 10 parts of water. 6 ml. of concentrated sulfuric acid (98%) were added to the solution. The solution was then boiled for 3 hours. With the lapse of the treating time, a part of the copolymer precipitated. When the copolymer was well precipitated by putting a large amount of water into the reaction system and was then filtered and water-washed, a white lactonized acrylic copolymer having 46% lactone was obtained.

EXAMPLE 5

100 g. of an acrylic copolymer powder consisting of 89% acrylonitrile and 11% vinyl acetate were added to 500 ml. of a boiling aqueous solution of 20% sulfuric acid and were kept boiling for 1 hour in a nonuniform system while being stirred. When the thus treated copolymer was then filtered and water-washed, a white lactonized copolymer having 5.5% lactone was obtained. A spinning solution was prepared by dissolving this lactonized acrylic copolymer in an aqueous solution of 48% sodium thiocyanate so that the copolymer concentration might be 10% and was spun into an aqueous solution of 10% sodium thiocyanate at 0° C. The spun filaments were washed with water, were then stretched 10 times the original length in boiling water, and were relaxed in pressure steam at 115 and 125° C. to be fibers of 3 deniers. The properties of the thus obtained fibers are shown in Table 5. Remarkable variations were seen in them as compared with the properties of fibers obtained by the same method as is mentioned above from an acrylic copolymer not lactonized.

TABLE 5

| | Heat treating temperature (° C.) | Shrinkage (percent) | Strength (g./d.) * | Elongation (percent) | Elasticity at 3% elongation (percent) | Young's modulus (g./d.) | Secondary stiffness (g./d.) |
|---|---|---|---|---|---|---|---|
| Lactonized copolymer fibers (according to the present invention) | 115 | 22.4 | 3.68 | 30.8 | 82.1 | 59.1 | 3.84 |
| Do | 125 | 27.7 | 3.40 | 38.3 | 82.0 | 55.4 | 2.34 |
| Untreated copolymer fibers | 115 | 34.4 | 3.03 | 44.9 | 83.4 | 51.8 | 1.13 |
| Do | 125 | 51.2 | 2.42 | 83.2 | 75.9 | 28.1 | 0.38 |

* Grams/denier.

EXAMPLE 6

Figure 3:
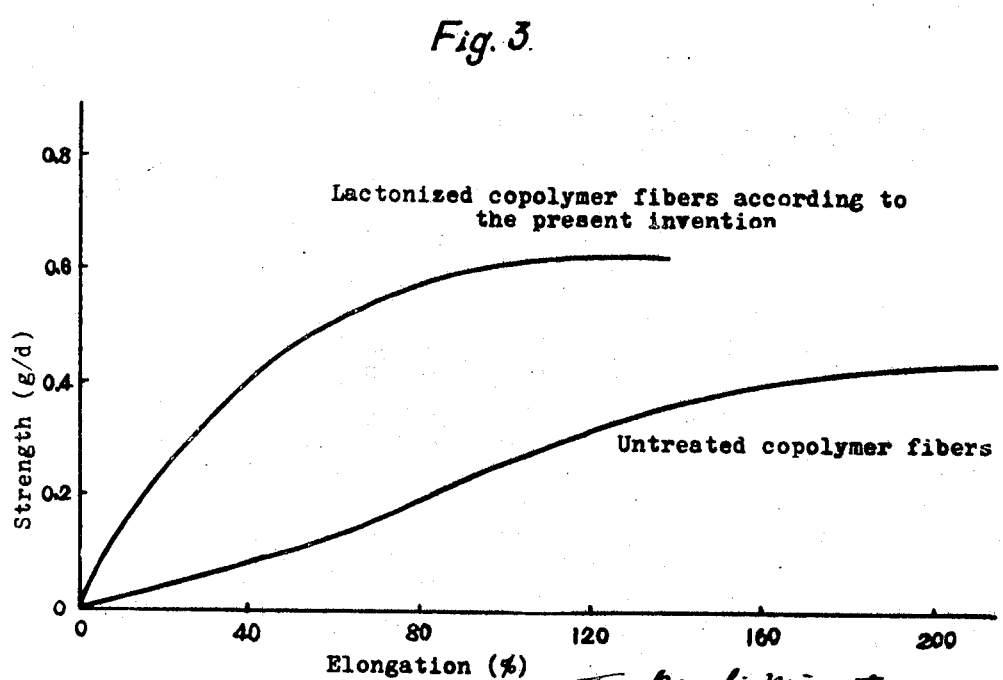

When 100 g. of an acrylic copolymer powder consisting of 89% acrylonitrile and 11% vinyl acetate were added to 500 ml. of a boiling aqueous solution of 20% sulfuric acid, were kept boiling for 4 hours in a nonuniform system while being stirred, and were then filtered and water-washed, a white lactonized acrylic copolymer having 9.5% lactone was obtained. This lactonized acrylic copolymer was soluble in sodium thiocyanate and dimethyl formamide. When this lactonized acrylic copolymer was spun, water-washed and stretched by the same process as in Example 5, and was then relaxed in pressure steam at 120° C. for 15 minutes, fibers of 3 deniers were made. The properties of the fibers were as in Table 6. It is clear that, as shown in Table 6, the strength, Young's modulus and secondary stiffness of the thus obtained fibers were higher than those of fibers obatined by the same process from the above mentioned acrylic copolymer not lactonized. Further, the strength-elongation curve in hot water at 95° C. was as in FIG. 3 and showed that the tendency to elongation in hot water had been remarkably reduced. Further, the dyeing degree is represented by the percentage of the dye deposition of the fibers when the fibers were dyed at 85° C. for 60 minutes under the dyeing bath conditions of 3% o.w.f. (on the weight of the fibers) C.I. Basic Orange 24, 1% o.w.f. acetic acid and a bath ratio of 1/100.

TABLE 6

| Sample | Strength (g./d.) | Elongation percent | Elasticity at 3% elongation percent | Young's modulus (g./d.) | Secondary stiffness (g./d.) | Dyeing degree percent |
|---|---|---|---|---|---|---|
| Fibers made from the lactonized acrylic copolymer according to the present invention | 3.66 | 31.8 | 84.4 | 61.2 | 4.23 | 0.282 |
| Fiber made from the untreated acrylic copolymer | 2.58 | 59.3 | 80.0 | 40.0 | 0.75 | 1.59 |

EXAMPLE 7

When 100 g. of an acrylic copolymer powder consisting of 89% acrylonitrile and 11% vinyl acetate were added to 1 liter of an aqueous solution of 15% hydrochloric acid, were kept boiling for 4 hours in a nonuniform system while being stirred, and were then filtered and water-washed, a white lactonized acrylic copolymer having 9.2% lactone was obtained. No production of any other different kind of structure than of the lactone was seen even with an infrared absorption spectrum.

EXAMPLE 8

When 50 g. of an acrylic copolymer powder consisting of 89% acrylonitrile and 11% vinyl acetate were added to 500 ml. of a boiling aqueous solution of acetic acid, were kept boiling for 2 hours while being stirred, and then filtered and water-washed, a white lactonized acrylic copolymer was obtained. No production of any other modified structure than of the lactone was seen in the infrared absorption spectrum of this lactonized acrylic copolymer.

As shown in Table 7, the degree of dissociation of acetic acid was so low that, in the relations of the acetic acid concentration, pH, and the amount of the produced lactone, in the case where the pH was not less than 3, no substantial production of a lactone was seen.

TABLE 7

| Acetic acid concentration (percent) | pH | Amount of produced lactone (percent) |
|---|---|---|
| 12 | 1.9 | 0.8 |
| 0.3 | 3.0 | Not more than 0.2 |

EXAMPLE 9

When 50 g. of an acrylic copolymer powder consisting of 89% acrylonitrile and 11% vinyl acetate were added to 500 ml. of a boiling aqueous solution of 17% paratoluene sulfonic acid, were kept boiling for 2 hours in a nonuniform system while being stirred and were then filtered and water-washed, a white lactonized acrylic copolymer having 8.4% lactone was obtained. No production of any other modified structure than of the lactone was seen in the infrared absorption spectrum of this lactonated acrylic copolymer.

EXAMPLE 10

Fifty grams of a powder of the copolymer consisting of 89% acrylonitrile and 11% vinyl acetate were poured into 500 ml. of boiling 20% oxalic acid aqueous solution. The mixture, in a non-homogeneous system, was boiled for 2 hours while stirring. Then the polymer powder was recovered by filtration and washed with water to obtain a white lactonized acrylic copolymer. The infrared absorption spectrum of this lactonized acrylic copolymer disclosed no other modification than lactonization.

EXAMPLE 11

The procedure of Example 10 was repeated except that 30% formic acid was employed instead of oxalic acid. A result similar to that of Example 11 was obtained.

EXAMPLE 12

One hundred grams of a powder of acrylic copolymer consisting of 90% acrylonitrile and 10% isopropenyl acetate were poured into 500 ml. of boiling 20% sulfuric acid aqueous solution. The mixture was boiled, in a non-homogeneous system, for 2 hours while stirring. Then the white lactonized copolymer was recovered by filtration and washed with water. The infrared absorptive spectrum disclosed the formation of a 5-member ring lactone.

EXAMPLE 13

An acrylonitrile copolymer consisting of 89% acrylonitrile and 11% vinyl acetate was treated with 13% nitric acid aqueous solution at 100° C. for 2 hours, to obtain a lactonized acrylic copolymer containing 9.1% lactone structure. The polymer, however, had been discolored and the infrared absorption spectrum disclosed the formation of modified structures (such as acid amide) other than lactonization. There was also observed an increase in an amount of carboxyl groups in the polymer.

The lactonized acrylic copolymers of the present invention are eminently suitable, by virtue of their excellent physical properties, such as stretchability, transparency, strength, etc., as hereinbefore exemplified for fibers, for the manufacture not only of fibers but also of films and other molded articles.

What we claim is:

1. An acrylonitrile copolymer comprising repeating units of acrylonitrile units and lactone units of the formula

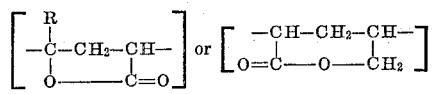

wherein R is a hydrogen atom or a methyl group, the lactone units being present in an amount of not greater than 46% by weight, the acrylonitrile copolymer being prepared by lactonizing a copolymer containing at least 60% by weight of acrylonitrile.

2. A fiber of the acrylonitrile copolymer as claimed in claim 1.

3. A film of the acrylonitrile copolymer as claimed in claim 1.

4. A method of producing a lactonized acrylic copolymer which comprises treating a copolymer of at least 60% by weight of acrylonitrile and at least one monomer selected from the group consisting of allyl alcohol, vinyl esters and allyl esters, with a medium having an acid content of not greater than 40% and a pH of not higher than 2, at a temperature of at least 60° C.

5. A method as claimed in claim 4 wherein the monomer is allyl alcohol.

6. A method as claimed in claim 4 wherein the acid content is not higher than 20%.

7. A method as claimed in claim 4 wherein the acid is selected from the group consisting of sulfuric acid, hydrochloric acid, phosphoric acid, formic acid, acetic acid, oxalic acid and toluenesulfonic acid.

8. A method as claimed in claim 4 wherein the vinyl ester monomer is selected from the group consisting of vinyl acetate, isopropenyl acetate, vinyl propionate, vinyl isobutylate and vinyl butylate.

9. A method as claimed in claim 4 wherein the allyl ester monomer is selected from the group consisting of allyl acetate and allyl caproate.

10. Method of producing a lactonized acrylic copolymer which comprises treating a copolymer of (1) at least 60% by weight of acrylonitrile, (2) at least one monomer selected from the group consisting of allyl alcohol, vinyl esters and allyl esters and (3) at least one monomer selected from the group consisting of allyl sulfonic acid, methallyl sulfonic acid and their salts, styrene, vinyl chloride and vinylidene chloride, with a medium having an acid content of not greater than 40% and a pH of not higher than 2 at a temperature of at least 60° C.

References Cited

UNITED STATES PATENTS 2,537,881   1/1951   Dickey.
2,653,146   9/1953   Gray et al.
2,861,056   11/1958  Minsk.

HARRY WONG, Jr., Primary Examiner

U.S. Cl. X.R.

260—29.6, 32.6, 78.3, 79.3, 80.6, 80.72, 80.81